United States Patent [19]

Sakurai

[11] 4,393,427
[45] Jul. 12, 1983

[54] MULTICHANNEL MAGNETIC HEAD

[75] Inventor: Yoshifumi Sakurai, Minoo, Japan

[73] Assignee: Olympus Optical Co., Ltd., Tokyo, Japan

[21] Appl. No.: 220,197

[22] Filed: Dec. 23, 1980

[30] Foreign Application Priority Data

Jan. 18, 1980 [JP] Japan ............................... 55-4303

[51] Int. Cl.³ .................... G11B 5/38; G11B 5/12; G11B 5/22
[52] U.S. Cl. .................................. 360/112; 360/110; 360/122
[58] Field of Search ............... 360/112, 113, 122, 123, 360/63, 125, 114, 110, 127; 324/251

[56] References Cited

U.S. PATENT DOCUMENTS

| 3,643,035 | 2/1972 | Tsukagoshi . | |
| 3,686,751 | 8/1972 | Sugiyama . | |
| 3,701,861 | 10/1972 | Suzuki | 360/112 |
| 3,715,522 | 2/1973 | Tsukagoshi | 360/112 |
| 3,943,570 | 3/1976 | Yamamoto | 360/112 |
| 3,987,485 | 10/1976 | Sugaya | 360/123 |
| 4,036,723 | 7/1977 | Schwartz et al. . | |
| 4,155,106 | 5/1979 | Muraoka | 360/122 |
| 4,179,719 | 12/1979 | Imamura | 360/112 |
| 4,186,481 | 2/1980 | Noguchi | 360/112 |
| 4,218,659 | 8/1980 | Arai . | |

FOREIGN PATENT DOCUMENTS

| 1102251 | 3/1961 | Fed. Rep. of Germany . |
| 12649 | 6/1980 | France . |
| 50-44814 | 4/1975 | Japan . |
| 51-113722 | 10/1976 | Japan . |
| 52-131711 | 11/1977 | Japan . |
| 54-7317 | 1/1979 | Japan . |
| 54-7317 | 3/1979 | Japan . |

OTHER PUBLICATIONS

"Magnetic Films for Hall Effect Devices Useful for Magnetic Recording Heads", IBM Technical Disclosure Bulletin, vol. 18, No. 12, May 1976, pp. 4214–4217.
"Gd$_x$Fe$_y$ and GdCoFe Materials for Magnetic Head Hall Sensors", Gambino et al., IBM Technical Disclosure Bulletin, vol. 18, No. 12, May 1976, p. 4218.
"Information Output Device for Logic and Switching Elements based on Ferromagnetic Single Crystals", M. A. Boyarchenkov, et al.; Moscow, Tbilisi (504–506).
"All-Amorphous Film Single-Level Masking Bubble Devices and Fabrication Method", IBM Technical Bulletin, vol. 18, No. 3, Aug. 1975, pp. 940/941.
"Neues Aus Der Technik", No. 4, Aug. 1978, Wurzburg, Ein besonderer Schreib-Lesekopf fur Magnetaufzeichnung, insbesondere fur Mehrspuraufnahmen", p. 4.

Primary Examiner—Robert M. Kilgore
Attorney, Agent, or Firm—Frishauf, Holtz, Goodman & Woodward

[57] ABSTRACT

A multichannel magnetic head has magnetic circuits for respective channels, each positioned to traverse a magnetic flux to be detected and a Hall element disposed in the magnetic circuits and used as a magnetic-electric converter. The Hall element is an amorphous magnetic thin film which consists essentially of an alloy containing a rare earth element (e.g. Gd) and a transistion metal (e.g. Co). To the amorphous magnetic thin film there are connected a pair of current terminals and Hall voltage terminals. The Hall voltage terminals are provided in the same number as the number of channels.

7 Claims, 19 Drawing Figures

FIG. 13B $W = 325 \mu m$
$\ell = 1.39 mm$
$I = 10 mA$
Gd-Go

MULTICHANNEL MAGNETIC HEAD

BACKGROUND OF THE INVENTION

This invention relates to a multichannel type magnetic head utilizing the Hall effect and adapted for use as a magnetic-electric conversion means.

There are known two types of magnetic heads for reading information from magnetic recording media. One includes a magnetic flux circuit comprised of a high-permeability core and a winding wound about the core. The other is composed of a similar magnetic flux circuit and a semiconductor Hall element inserted in a front or back gap provided in the magnetic flux circuit. Hereinafter the first-mentioned-type will be called a "winding-type magnetic head" and the other type a "Hall-element type magnetic head".

The output of the winding-type magnetic head is proportional to the time-based changing rate $d\phi/dt$ of magnetic flux $\phi$ detected. The output is therefore reduced as the frequency of the magnetic flux is lowered. Accordingly it is impossible to detect magnetic flux which has undergone no time-based change. The output voltage of the magnetic head is remarkably reduced as the tape running speed becomes lower when flux $\phi$, if any, varies with time, especially when the recording track of the tape is narrow. The track intervals between channels of the winding-type magnetic head can be narrowed but to a limited extent. This is because the winding-type magnetic head needs to have a winding space.

The output of the Hall-type magnetic head is proportional to the magnitude of magnetic flux detected. Thus, the output level will hardly depend on frequency if the magnitude of the magnetic flux passing through the magnetic flux circuit undergoes a negligibly small frequency-based change. This means that the Hall-type magnetic head can have a frequency characteristic which is flat over a considerably wide frequency range, from the DC region to the high-frequency region. What is more, the Hall element occupies but so small space that the track intervals between channels may be narrowed enough. Thus, the magnetized surface of the tape may be utilized efficiently, and the track density of the tape may be increased.

A multichannel magnetic head utilizing the features of the Hall element is disclosed in Japanese Pat. No. 44814/75. The magnetic head uses Hall elements for respective channels in order to eliminate crosstalk between the channels. For each of the Hall elements there are provided current supply lines and signal output lines. Consequently, the magnetic head needs to have so many external terminals that it fails to make a sufficiently compact multichannel magnetic head with many channels. Furthermore, it becomes difficult for the magnetic head to have both a high S/N (signal-to-noise) ratio and a good resolution (or an excellent high frequency response) when the Hall elements are made of indium-antimonide (InSb) as stated in Japanese Pat. No. 44814/75.

When a Hall element is disposed in a front gap provided in the magnetic flux circuit, it should better be as thin as possible. The thinner is the Hall element, the narrower becomes the front gap and the better becomes the resolution of the multichannel magnetic head. Here arises a problem with a commonly used Hall element, i.e. a semiconductor polycrystalline thin film, a typical example of which is an indium-anitmonide film. That is, the thinner is the element, the more it is affected by the boundary regions of polycrystals and the greater becomes the current noise. The magnetic head having a thin semiconductor Hall element may indeed obtain a high resolution but cannot have a high S/N ratio.

This problem arises also in case the semiconductor Hall element is disposed in a back gap provided in the magnetic flux circuit. In this case, the thickness of the Hall element does not directly affect the resolution. But it affects the reproduction efficiency and eventually the resolution. That is, the narrower the front gap is, the lower bocomes the reluctance of the front gap. If the reluctance of the front gap is low, the reproduction efficiency will be deteriorated. This is because if the reluctance of the front gap is low, most of the detected magnetic flux is shunted at the front gap section, thus reducing the magnitude of the magnetic flux transmitted to the Hall element disposed in the back gap.

It is therefore essential to use an efficient magnetic flux circuit in case the front gap is narrow to improve the frequency characteristic (i.e. resolution) of the magnetic head. In other words, a magnetic flux circuit having a back gap with a Hall element inserted in the gap needs to have a sufficiently low reluctance.

The most effective method to lower the reluctance of a magnetic flux circuit is to narrow the back gap of the circuit. A semiconductor Hall element has a permeability much lower than that of the high-permeability ferromagnetic substance forming a magnetic flux circuit. Thus, the reluctance of the magnetic flux circuit can be much lowered by reducing the back gap to in the order of microns. This follows that the Hall element must be very thin. Then, just as in the case where the Hall element is disposed in the front gap, the Hall element must be made thinner and the current noise then inevitably increases if the front gap is narrowed to provide a higher resolution and if the back gap is narrowed to compensate for the resultant deterioration of reproduction efficiency.

This invention aims to overcome the above-mentioned problems of prior art. An object of this invention is to provide a multichannel magnetic head which has less external terminals than has the prior art head and which has improved resolution, S/N ratio, channel separation and track density. Another object of this invention is to provide a method for manufacturing such a multichannel magnetic head.

SUMMARY OF THE INVENTION

To the above and other ends, this invention provides a multichannel magnetic head, wherein a Hall element, i.e. an amorphous magnetic thin film of an alloy containing a rare earth element and a transition metal is used as a magnetic-electric conversion element, the amorphous magnetic thin film is arranged in magnetic circuits for respective channels provided, and a pair of current terminals and Hall voltage terminals are connected to the amorphous magnetic thin film, the number of said voltage terminals corresponding to that of the channels provided.

The thin film Hall element of the above-mentioned magnetic head works in common for the channels and may be biased by only one of the pair of terminals. Thus, only two external terminals are sufficient for biasing the Hall element. That is, the number of external terminals required is much reduced as compared with a prior art Hall element type magnetic head wherein a plurality of Hall elements are used for the respective channels.

The amorphous magnetic thin film contains a rare earth/transition metal such as gadolinium cobalt (GdCo) and gadolinium iron (GdFe). The film therefore exhibits the anomalous Hall effect. Owing to the anomalous Hall effect the film has a high magnetic-electric conversion efficiency. Also owing to the amorphous Hall element the current noise is eliminated, which would otherwise be generated due to the boundary regions of polycrystals. The magnetic head has a high sensitivity and a high S/N ratio even if its front gap is narrowed or even if its thickness is reduced in order to obtain a higher resolution. Further, the track intervals of the magnetic head may be much reduced since the thin film Hall element can detect a signal of any of the channels. Still further, practically no crosstalk will occur in the Hall element if Hall voltage terminals are spaced by a distance longer than a predetermined one.

According to this invention it is therefore possible to provide a multichannel magnetic head which has a small number of external terminals and which has a high S/N ratio and a high track density.

This invention can be more fully understood from the following detailed description when taken in conjunction with the accompanying drawings.

DETAILED DESCRIPTION

Preferred embodiments of this invention, for example 4-channel magnetic heads, and methods for manufacturing them will be described with reference to the accompanying drawings, wherein like and the same numerals are used to denote similar and the same parts, for simplifying the description.

Figure 1:
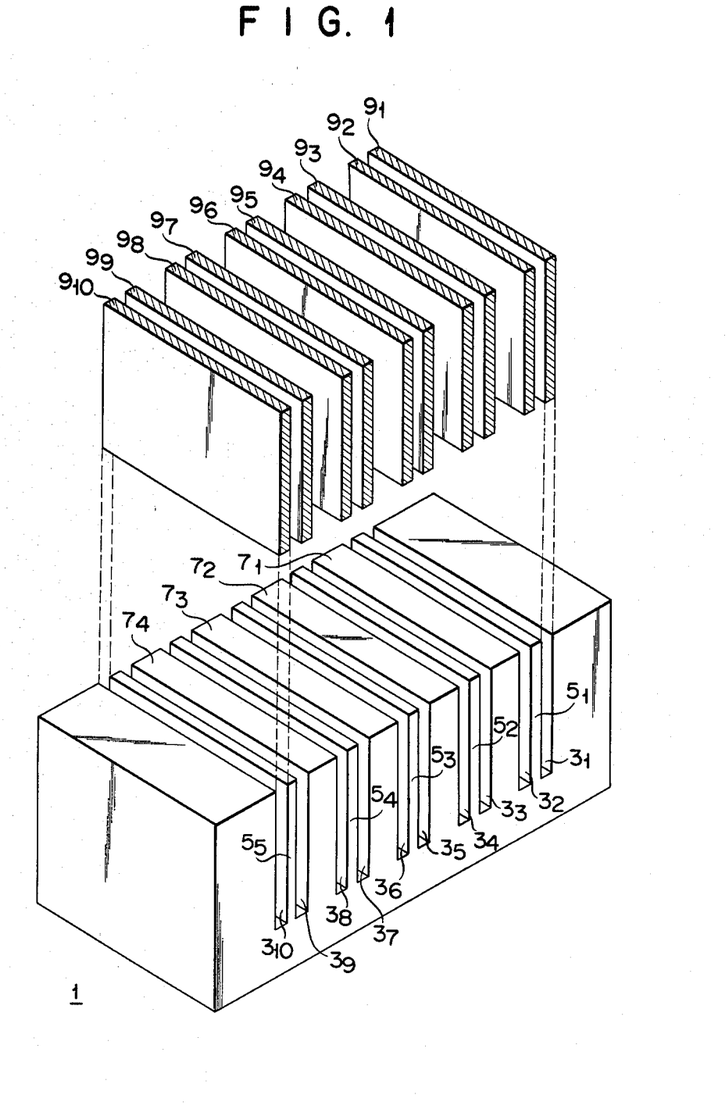
FIG. 1 is a perspective view of a core block 1 of a magnetic head according to this invention, the core block 1 having grooves $3_1$ to $3_{10}$.

FIG. 1 shows a core block 1 or a magnetic head according to this invention. The core block 1 is made of a ferromagnetic substance of high permeability such as an Mn-Zn ferrite. Grooves $3_1$ to $3_{10}$ are cut in the block 1 at predetermined positions. These grooves remarkably increase reluctance between magnetic circuits of adjacent channels. The adjacent grooves $3_1$ and $3_2$ define a shielding portion $5_1$ between them. Likewise, the adjacent grooves $3_3$ and $3_4$ define a shielding portion $5_2$, and adjacent grooves $3_5$ and $3_6$ define a shielding portion $5_3$. Similarly, the adjacent grooves $3_7$ and $3_8$ define a shielding portion $5_4$, and the adjacent grooves $3_9$ and $3_{10}$ define a shielding portion $5_5$. Moreover, the grooves $3_2$ and $3_3$ define a magnetic circuit portion $7_1$ between them. Likewise, the grooves $3_4$ and $3_5$ define a magnetic circuit portion $7_2$, the grooves $3_6$ and $3_7$ a magnetic circuit portion $7_3$, and the grooves $3_8$ and $3_9$ a magnetic circuit portion $7_4$. Into the grooves $3_1$ to $3_{10}$ non-magnetic spacers $9_1$ to $9_{10}$ are inserted. Then, a low melting point glass, an organic bonding agent or the like is applied to fix the spacers $9_1$ to $9_{10}$ in the respective grooves $3_1$ to $3_{10}$.

Figure 2:
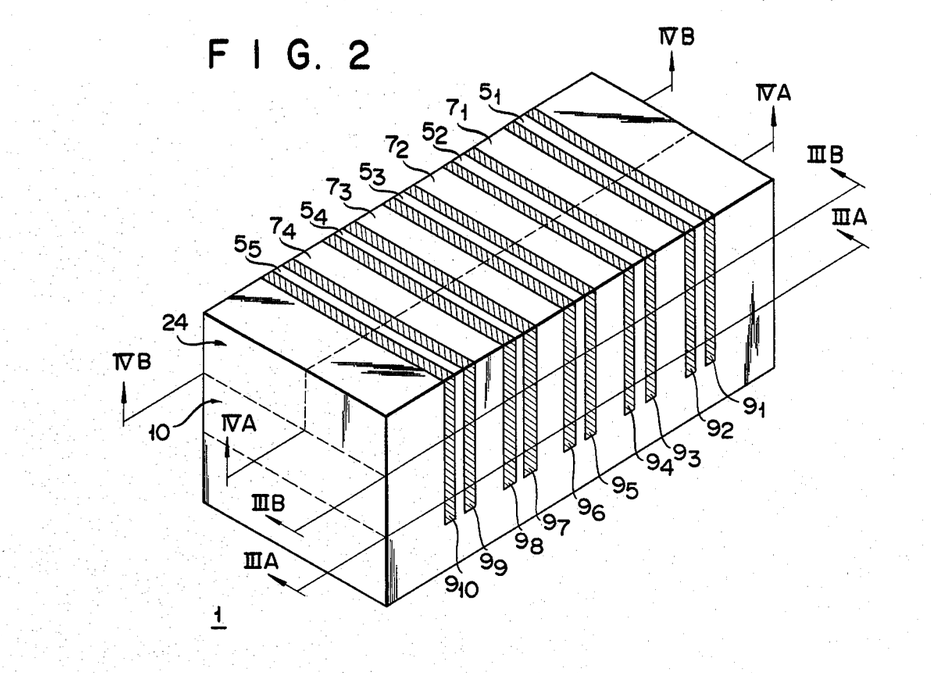
FIG. 2 is a perspective view of the core block 1 of FIG. 1, with spacers $9_1$ to $9_{10}$ inserted respectively in the grooves $3_1$ to $3_{10}$.
Figure 3:
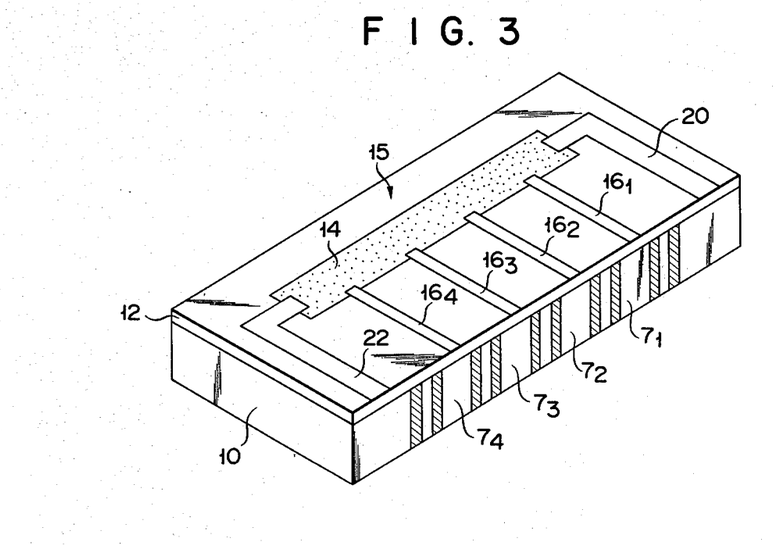
FIG. 3 is a perspective view of a first ferromagnetic block 10 which includes a Hall element 15 and which has been obtained by cutting the core block 1 along line IIIA—IIIA and line IIIB—IIIB in FIG. 2.

FIG. 2 shows the core block 1 with the spacers $9_1$ to $9_{10}$ secured in the grooves $3_1$ to $3_{10}$. The block 1 is sliced along lines IIIA—IIIA and IIIB—IIIB into thinner blocks. One of the thin blocks thus made, a block 10 (hereinafter called "first ferromagnetic block") is then ground to have an optically flat upper surface. On the optically flat surface of the first ferromagnetic block 10 a first insulating layer 12 is formed approximately 2,000 Å as shown in FIG. 3 by evaporating or sputtering $SiO_2$ or other material. An amorphous magnetic thin film 14 of Gd-Co or Gd-Fe is formed on the insulating layer 12 by vacuum evaporation or RF sputtering. The film 14 has a thickness with a range from, for example, about 2,000 Å to about 10,000 Å (about 0.2 micron to about 1.0 micron). The atomic percentage of Gd contained in the film 14 is chosen to be lower than approximately 40%. More precisely, the atomic precentage of Gd is about 10 to 40%. As long as the atomic percentage of Gd falls within this range, the film 14 has an axis of easy magnetization which is normal to its surface—that is, it has magnetic anisotropy. The film 14 is subjected to, for example, photoetching to have such a predetermined shape as shown in FIG. 3.

On the film 14 and the insulating layer 12 there are formed voltage terminals $16_1$ to $16_4$ and current terminals 20 and 22, all made of aluminum or copper, by vacuum evaporation or sputtering and then by photo-etching. This done, an amorphous thin-film Hall element 15 is completed.

The voltage terminals $16_1$ to $16_4$ are laid on the central parts of the magnetic circuit portions $7_1$ to $7_4$, respectively. The terminals $16_1$ to $16_4$ have a specific relation with the portions $7_1$ to $7_4$, which will hereinafter be described with reference to FIG. 10 et. seq.

Figure 4:
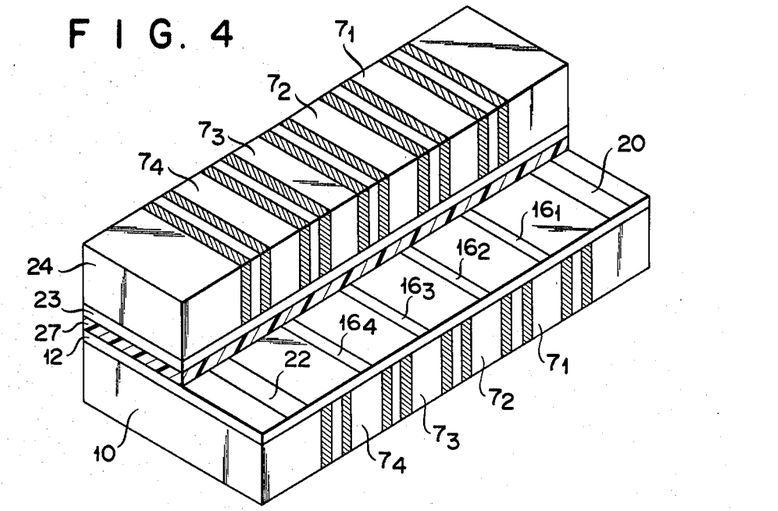
FIG. 4 is a perspective view of a head block 26 consisting of the block 10 of FIG. 3 and a second ferromagnetic block 24 which has been obtained by cutting the core block 1 along line IVA—IVA and line IVB—IVB in FIG. 2.
Figure 5:
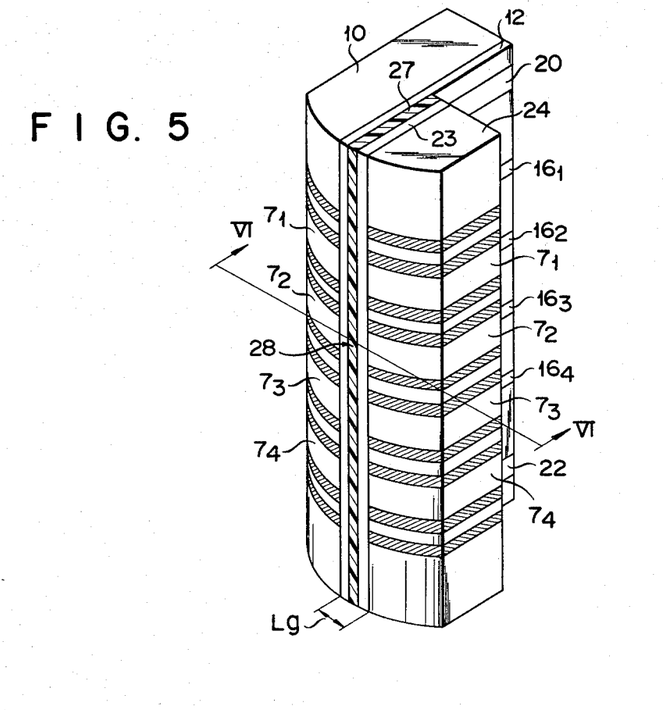
FIG. 5 is a perspective view of the head block 26, the front gap side of which is ground to provide a curved surface.

As shown in FIG. 2, the top thin block is cut along lines IVA—IVA and IVB—IVB into two pieces. One of the pieces, a piece 24 (hereinafter called "second ferromagnetic block") has a width, or the distance between line IVA—IVA and line IVB—IVB, which is preferably about half the width of the top thinner block. This cutting width may, however, be enough if the block 24 is able to completely cover the thin film 14 and therefore the cutting width may be determined optionally. On one major surface of the second ferromagnetic block 24 an insulating layer 23 of $SiO_2$ or other material is formed by sputtering, for example. Thereafter the block 24 is bonded to the first ferromagnetic block 10 as illustrated in FIG. 4, using a glass layer 27 of a low melting point as a bonding means. As a result, the thin film Hall element 15 is sealed. The first ferromagnetic block 10 and the second ferromagnetic block 24 thus bonded together provide a magnetic head block 26. That surface of the block 26 which includes a front gap 28 is curved by grinding as shown in FIG. 5 so that recording media such as a magnetic tape may smoothly run on it. In this way a multichannel magnetic head is completed. The voltage terminals $16_1$ to $16_4$ and the current terminals 20 and 22 are connected to external terminals (not shown). The head is then put into a shield case (not shown) and fixed in it with epoxy resin, etc.

Figure 6:
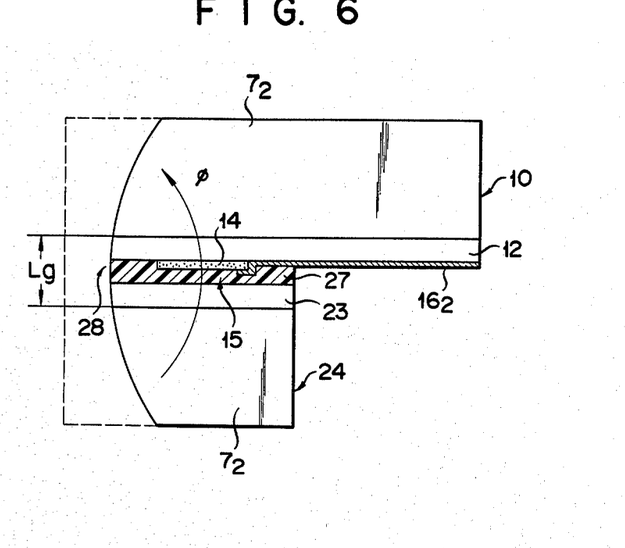
FIG. 6 is a cross-sectional view of the head block 26 of FIG. 5, taken along line VI—VI in FIG. 5.

FIG. 6 is a cross-sectional view of the multichannel magnetic head, taken along line VI—VI of FIG. 5. As may be apparent from FIG. 6, a magnetic flux circuit of the head, which consists of the ferromagnetic blocks 10 and 24, have a short magnetic flux path. Magnetic flux $\phi$ detected at the front gap 28 can therefore pass through the thin film 14 with a high efficiency. This helps much improve the S/N ratio of the magnetic head. Being amorphous, the thin film 14 serves to improve the S/N ratio very much, too. That is, the amorphous thin film Hall element removes the current noise which is generated due to the boundary regions of crystals. As a result, the magnetic head suffers little noise though the film 14 is thin.

Multichannel magnetic heads of the above-mentioned structure with a Gd-Co or Gd-Fe film 14 having a thickness of 2,000 to 3,000 Å were manufactured for trial and put to test. They exhibited an S/N ratio of about 50 dB. This fact means tha the width Lg of the front gap 28 can be reduced if the insulating layers 12 and 23 are made sufficiently thin, less than one micron, because the film 14 can be so thin as 2,000 to 3,000 Å. The multichannel magnetic head according to this invention thus has both a good resolution and a high S/N ratio.

The ferromagnetic blocks 10 and 24 may be made of Sendust or Permalloy, or a combination of these materials. No problem will arise if the spacers $9_1$ to $9_{10}$ are made of either a metallic material or a nonmetallic material so long as the material is non-magnetic. When the spacers $9_1$ to $9_{10}$ are made of metallic material, it is possible to electrostatically shield the channels from one another by connecting the spacers $9_1$ to $9_{10}$ to a circuit ground.

Figure 7:
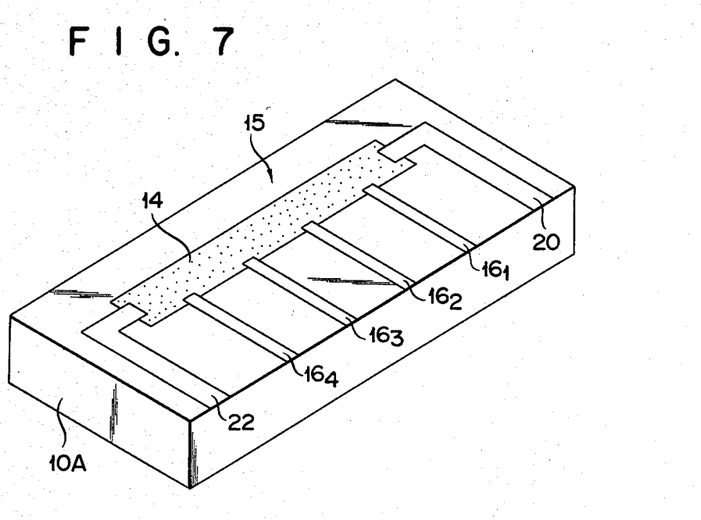
FIGS. 7, 8 and 9 show a modification of the head block 26 shown in FIGS. 3, 4 and 5.
Figure 8:
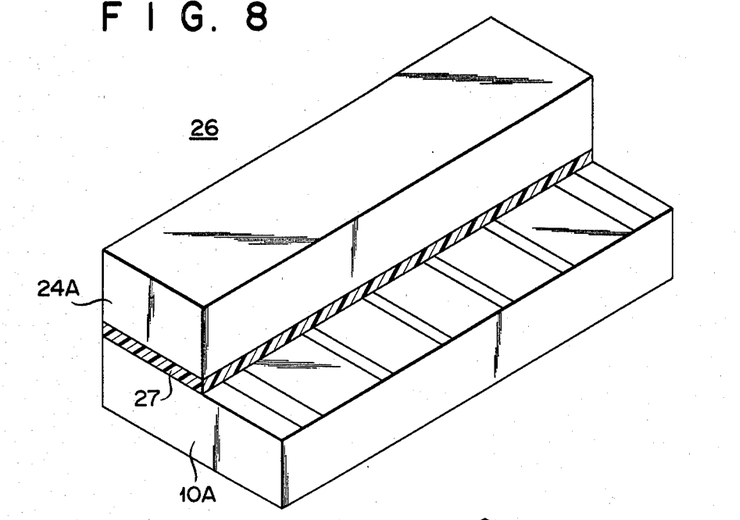
Figure 9:
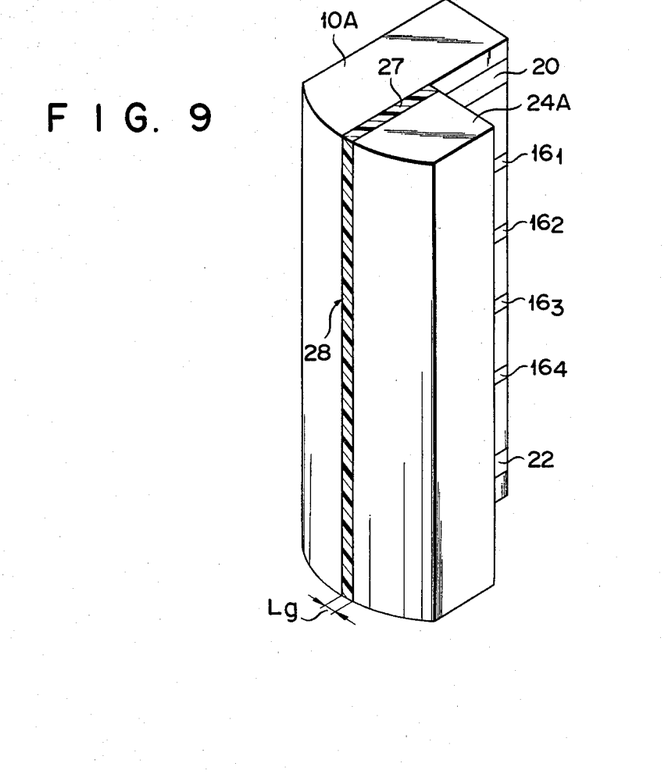

FIGS. 7, 8 and 9 show a modification of the multichannel magnetic head of FIGS. 3 to 5. The modification has no equivalents to the insulating layers 12 and 23 shown in FIG. 4. It comprises a first insulator block 10A and a second insulator block 24A which are made of ceramics, glass or the like. On one major surface of the first insulator block 10A there are formed an amorphous magnetic film 14 (or a Hall element 15), voltage terminals $16_1$ to $16_4$ and current terminals 20 and 22 substantially in the same manner as in the embodiment of FIGS. 3 to 5. The first insulator block 10A and the second insulator block 24A are bonded directly to each other by, e.g. low melting type glass 27, thereby sealing the Hall element 15 within the resultant glass layer 27. The low melting type glass 27 provides a sufficient bonding strength between the blocks 10A and 24A. The bonding of the blocks 10A and 24A may be made by adhesive-bonding or pressure-holding. In the case of FIGS. 7 to 9, the blocks are bonded by a low melting type glass 27. However, even by a pressure-holding, since the head block 26 are fixed with a epoxy resin (not shown), the mechanical bonding strength between blocks 10A and 24A is large enough.

Without insulating layers 12 and 23, the multichannel magnetic head of FIGS. 7 to 9 may have a front gap 28 of a width Lg narrower than that of the front gap 28 of the embodiment shown in FIGS. 3 to 5. Unlike the ferromagnetic blocks 10 and 24, the insulator blocks 10A and 24A have no grooves and can be made more easily. Further, the insulator blocks 10A and 24A need not be so carefully bonded together as the ferromagnetic blocks 10 and 24 must be bonded so that the magnetic circuit portions 7 of the block 10 face the corresponding magnetic circuit portions 7 of the block 24. However, the magnetic circuit of the head shown in FIG. 9 has a higher reluctance since the insulator blocks 10A and 24A are non-magnetic. Consequently, the magnetic head has a lower reproduction efficiency. For this reason, the head of FIG. 9 is suitable for use in combination with an FM recorder or a digital recorder in which a saturation level recording is applied.

Figure 10:
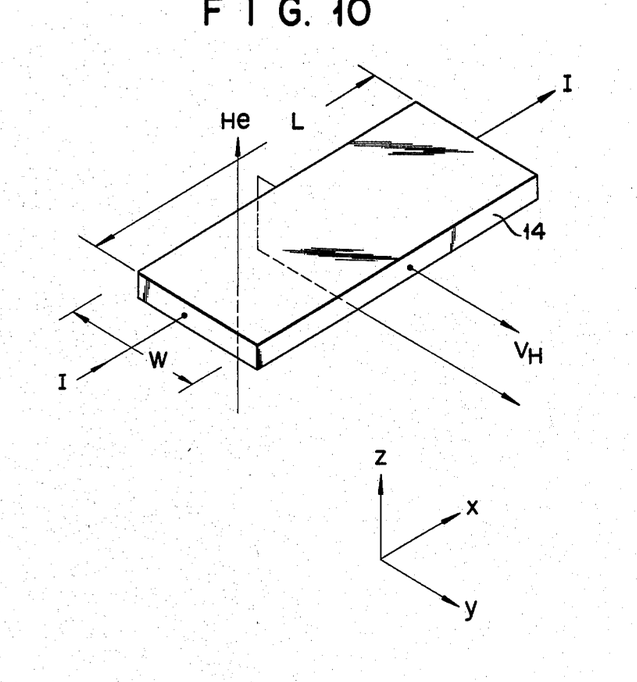
FIGS. 10 and 11 illustrate domain wall motion within the Hall element film 14 of the magnetic head shown in FIG. 5 or 9.
Figure 11:
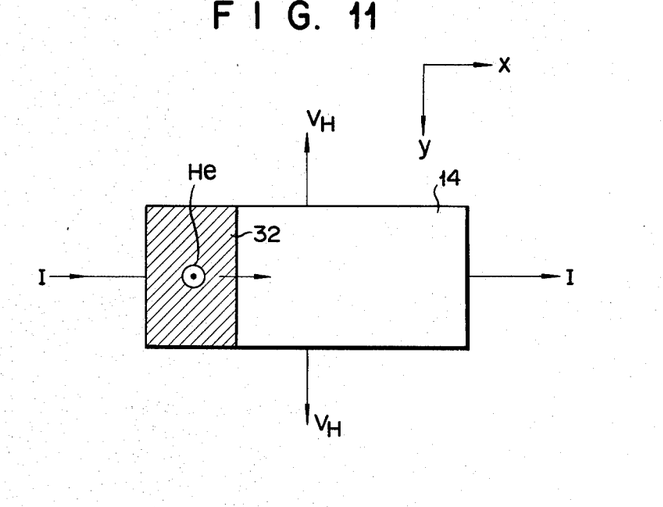

FIGS. 10 and 11 illustrate domain wall motion within the thin film 14. In these figures L designates the length of the film 14 in X-direction of biasing current I, and W the width of the film 14 in Y-direction of Hall voltage VH. He denotes an external magnetic field applied in Z-direction perpendicular to the surface of the film 14. It is assumed here that the thin film 14 consists of a number of subsections which are spontaneously magnetized in particular directions. When the magnetic field He is applied on the thin film 14 at a predetermined position, a domain wall 32 moves as shown in FIG. 11. At the same time, one subsection of the film 14 is spontaneously magnetized in a particular direction, some other subsections are then spontaneously magnetized in specific directions, still some other subsections are spontaneously magnetized in particular directions, and so forth. When the magnetic field becomes very strong, the film 14 is magnetized in one direction and is saturated. Thus, the magnetization of the thin film 14 may be explained by the motion of the domain wall 32.

Figure 12:
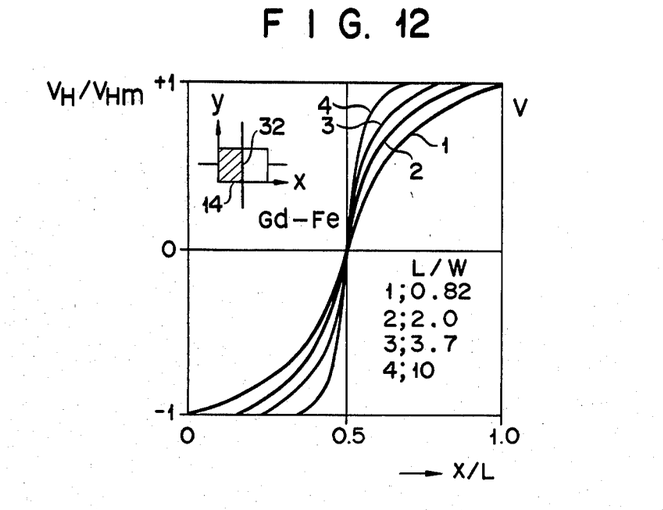
FIG. 12 is a graph illustrating the relation between the Hall output and the position of the domain wall shown in FIG. 11.

FIG. 12 is a graph showing the relationship between the position of the domain wall 32 and the Hall output. The ratio of the Hall voltage VH to the maximum Hall voltage VHM, i.e. VH/VHM, is plotted on the ordinate. The position x/L of the domain wall 32 normalized to the length L of the film 14 is plotted on the abscissa. Parameters 1 to 4 denote the ratio of the length L to the width W, i.e. L/W. The Hall voltage output terminal is provided at the position L/2. The film 14 is made of a GdFe alloy. As shown in FIG. 12, the voltage VH is equal to the voltage VHM when L/W=0.82 (parameter 1) and when x/L=1 (or x=L). The voltage VH is equal to the voltage VHM before x/L becomes 1 and saturation occurs when L/W=10 (parameter 4). Suppose the domain wall 32 moves from the left to the right. In this case the Hall sensitivity $\partial VH/\partial He$ substantially ceases to exist when the domain wall 32 is at the right end of the thin film 14—that is, when x/L=1. The maximum Hall sensitivity is obtained when the domain wall 32 is at the central portion—that is, when x/L=0.5 or when the wall 32 is at the Hall voltage output terminal.

Figure 13A:
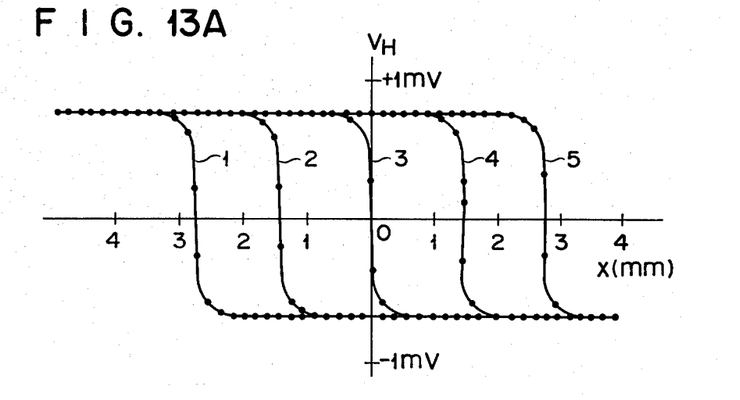
FIGS. 13A and 13B are graphs illustrating the relation between the Hall output voltage and the domain wall at each of the Hall voltage terminals.
Figure 13B:
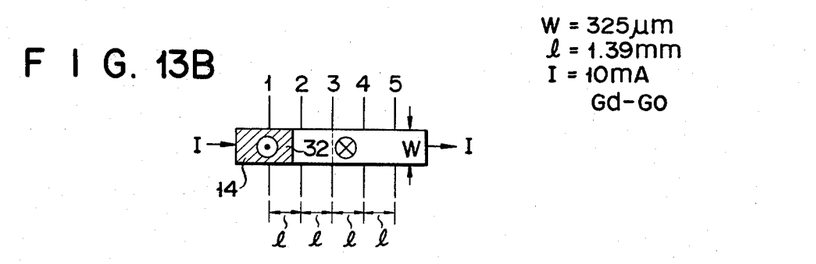

FIGS. 13A and 13B show the relation between the Hall voltage VH and the position x of the domain wall 32 in case five pairs of Hall voltage output terminals are provided. In FIGS. 13A and 13B, l represents the distance between the Hall voltage output terminals, W denotes the width of the thin film 14. The ratio of l to W, i.e. l/W, is selected to be about 4.3. The thin film 14 may be made of either a GdCo alloy or a GdFe alloy. As well understood from FIG. 12 and the related description, the voltage VHM (i.e. saturation Hall voltage) is obtained when the domain wall 32 is positioned at a distance l/2 from a Hall voltage output terminal. When a Hall voltage output terminal is separated from the Hall voltage output terminal with a distance of l/2 or more, VH is equal to VHM and the Hall sensitivity $\partial VHM/\partial He$ substantially ceases to exist due to the domain wall 32. Thus, it becomes possible to prevent overlapping of the magnetically sensitive regions at the respective Hall voltage output terminals, merely by arranging the Hall voltage output terminals at interval l which is greater than 4W. As a result, it becomes possible to eliminate the crosstalk which has been generated inside the film 14 and to obtain distinctive pieces of information (e.g. magnetic fluxes $\phi_1$ and $\phi_2$ passing through the magnetic circuits of the adjacent two channels, using only one Hall element, i.e. the thin film 14.

FIGS. 14 to 17 show circuits for converting magnetic signals into electric signals for the respective channels of the magnetic head shown in FIG. 5 or 9.

Figure 14:
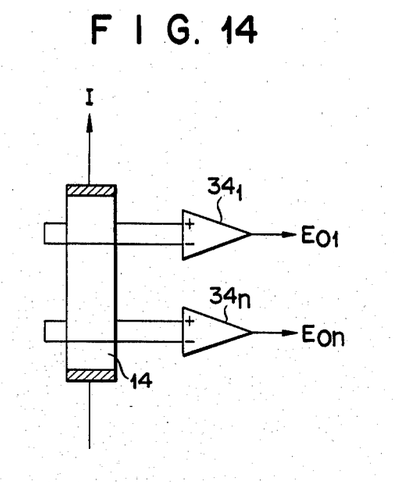
FIGS. 14 through 17 are circuit diagrams of means for obtaining the signal from each channel of the Hall element shown in FIG. 5 or 9.

The circuit shown in FIG. 14 comprises amplifiers $34_1$ to $34_n$ each having two input terminals (+, −). A pair of voltage output terminals of each channel of the magnetic head are connected to the input terminals (+, −) of the corresponding amplifier, respectively. The amplifiers $34_1$ to $34_n$ are balanced input type amplifiers or differential amplifiers.

Figure 15:
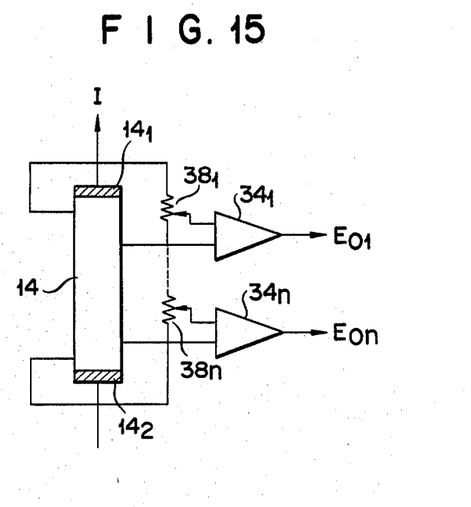

The circuit shown in FIG. 15 comprises amplifiers $34_1$ to $34_n$ each having an inverted input terminal and a non-inverted input terminal. It further comprises variable resistors $38_1$ to $38_n$ each having a slider. One voltage output terminal of each channel of the magnetic head is connected to the inverted input terminal of the corresponding amplifier. The non-inverted input terminal of each amplifier is connected to the slider of the corresponding variable resistor. The variable resistors $38_1$ to $38_n$ are connected to constitute a series circuit, the ends of which are connected to the thin film 14 respectively at the upstream and downstream of current I flowing through the film 14 in the lengthwise direction thereof. Alternatively, each of the resistors $38_1$ to $38_n$ may have its ends connected directly to the current terminals $14_1$ and $14_2$ of the film 14, respectively. The resistors $38_1$ to $38_n$ are used to effect offset balancing of the amplifiers $34_1$ to $34_n$.

Figure 16:
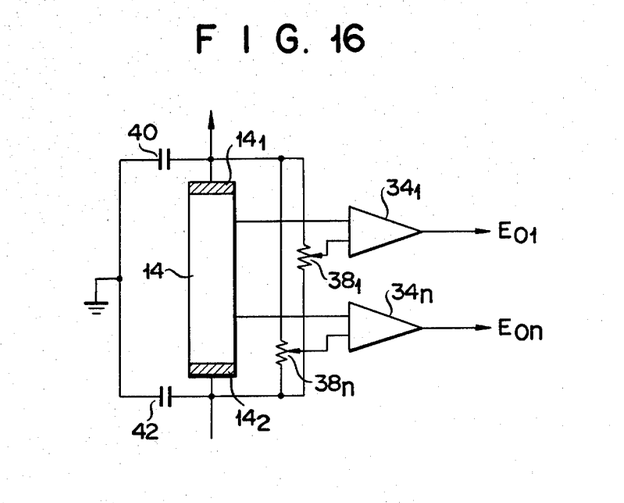

The circuit shown in FIG. 16 comprises amplifiers $34_1$ to $34_n$, variable resistors $38_1$ to $38_n$ and capacitors 40 and 42. The variable resistors $38_1$ to $38_n$ are provided for effect offset balancing of the amplifiers $34_1$ to $34_n$. They are connected in parallel to one another. The current terminals $14_1$ and $14_2$ of the thin film 14 of the magnetic head are by-passed to a ground circuit through the capacitors 40 and 42, which reduce the impedance at the current terminals $14_1$ and $14_2$.

Figure 17:
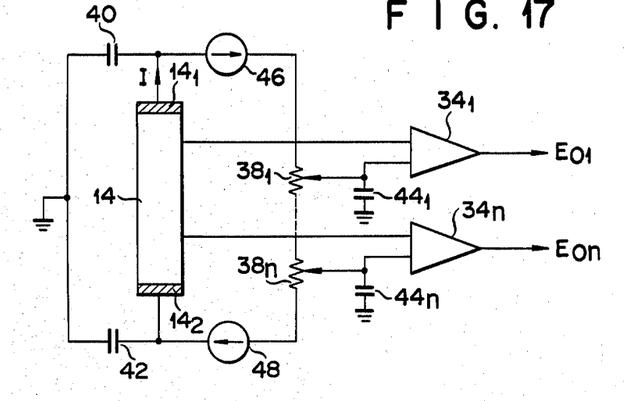

The circuit shown in FIG. 17 comprises amplifiers $34_1$ to $34_n$, variable resistors $38_1$ to $38_n$, capacitors 40 and 42, capacitors $44_1$ to $44_n$, and current sources 46 and 48. The variable resistors $38_1$ to $38_n$ are connected to constitute a series circuit. The current source 46 is connected between one end of the series circuit of the resistors $38_1$ to $38_n$ and the current terminal $14_1$ of the thin film 14, and the current source 48 is connected between the other end of the series circuit and the current terminal $14_2$ of the film 14. Only one of the current sources may be used. The sliders of the variable resistors $38_1$ to $38_n$ are grounded through the capacitors $44_1$ to $44_n$, respectively. The capacitors $44_1$ to $44_n$ therefore shunt noise and other unwanted signal components which are normally supplied to the amplifiers $34_1$ to $34_n$ from the slider sides of the variable resistors $38_1$ to $38_n$.

Figure 18:
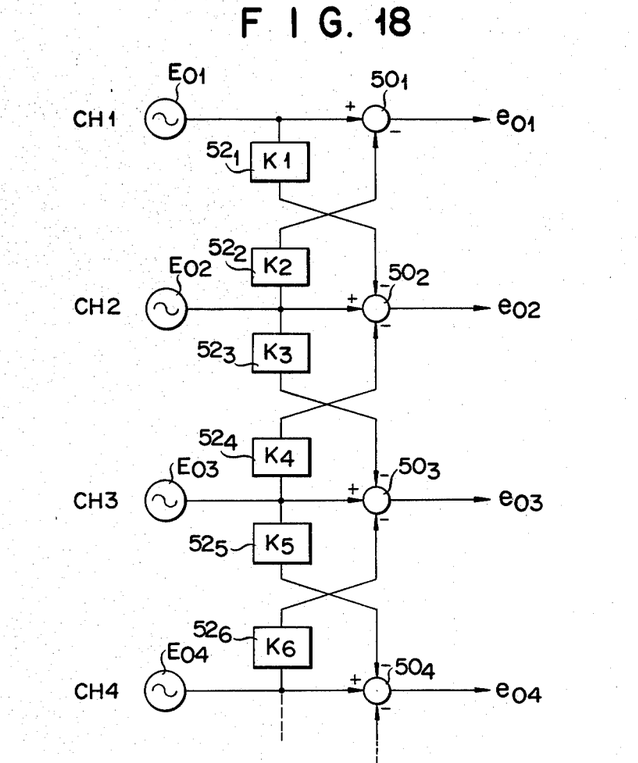
FIG. 18 is a circuit diagram of means for electrically eliminating crosstalk between the channels.

FIG. 18 shows a circuit which eliminates the crosstalk generated between the channels of the magnetic head shown in FIG. 5 or 9. Signals detected at the Hall voltage terminal corresponding to the first channel are amplified by the amplifier $34_1$ of the circuit shown in FIG. 14, 15, 16 or 17. An output voltage E01 of the amplifier $34_1$ is supplied to the positive-phase input terminal of a mixer $50_1$ and also to the negative-phase input terminal of a mixer $50_2$ through an attenuator $52_1$. Similarly, an output voltage E02 is supplied to the positive-phase input terminal of the mixer $50_2$ and also to the negative-phase input terminal of the mixer $50_1$ through an attenuator $52_2$. An output voltage E03, an output voltage E04 and so on are supplied to mixers $50_2$, $50_3$, $50_4$ and so on in the same manner.

The output voltage E02 of the second channel may be represented by the following equation:

$$E02 = \overline{E02} + K1E01 + K4E03 \quad (1)$$

wherein $\overline{E02}$ is signal components of the second channel with no crosstalk component, K1E01 is the crosstalk components leaking from the first channel to the second channel, and K4E03 is the cross talk components leaking from the third channel to the second channel.

In the mixer $50_2$, K1E01 and K4E03 (both being of negative phase) and E02 of equation (1) compose a second channel signal e02 of which component is only E02. To obtain a second channel signal e02 containing no crosstalk components, the attenuation ratio K1 of the attenuator $52_1$ and the attenuation ratio K4 of the attenuator $52_4$ must be adjusted accurately. When a constant phase difference exists between the output voltages E01, E02, E03, . . . , it is desired that a variable phase shift type phase shifter be connected in series to each of the attenuators $52_1$, $52_2$, $52_3$, . . . . This is because the signal e02 may contain crosstalk components despite the adjustment of the attenuation ratios of the attenuators $52_1$ and $52_4$ when the phase differences between the signals E01 and E02 and between the signals E02 and E03 are great.

Although the embodiment of this invention has been described in detail with reference to the accompanying drawings, it is to be understood that the invention is not limited to the embodiment and that various changes and modifications may be effected within the scope or spirit of the invention. For example, the invention may be applied to a 2-channel magnetic head or a magnetic head of more channels. The shielding portions $5_1$ to $5_5$, especially shielding portions $5_1$ and $5_5$, may be omitted in the embodiment of FIGS. 1-5. If the crosstalk increases due to omission of the shielding portions, the crosstalk cancelling circuit shown in FIG. 18 may be used. Further, the thin film 14 may be made of material other than GdCo and GdFe.

The thin film 14 may be an amorphous thin film of a gadolinium cobalt (GdCo) alloy whose gadolinium atomic percentage is about 15 to 20% or 24-30%, preferably 18 to 20% or 24 to 26%, and more preferably about 20% or about 24%. Since the GdCo thin film is amorphous, the current noise generally caused by the boundary regions of polycrystals is extremely small. Furthermore, since the film has an axis of easy magnetization perpendicular to the film surface, it may constitute a magnetic circuit having a high magnetic-electric conversion efficiency. The amorphous GdCo thin film generates but little current noise and provide a relatively great output voltage owing to anomalous Hall effect.

A magnetic head of high S/N ratio and high sensitivity may be obtained by the technique according to this invention. A GdCo thin film whose gadlinium atomic percentage is 15 to 20% or 24 to 30% shows a linear magnetic-electric conversion characteristic which encounters substantially no hysteresis in temperature range of $-20°$ C. to $+60°$ C. The linear conversion characteristic is desirable in reproducing analog signals such as audio signals. Since the GdCo alloy is used in the form of a thin film Hall element (or a thin film magnetic-electric conversion element), the frequency characteristic curve of the magnetic head is flat over the frequency range from the DC region to higher frequency regions. Thus, the magnetic head of this invention has an excellent S/N ratio and an excellent frequency characteristic.

It should be noted that the above-given range of gadolinium atomic percentage was determined by subjecting samples of thin films to X-ray diffractiometry or the like. The range 15 to 20% or 24 to 30% does not therefore define the desired target composition for forming a thin film by sputtering. A thin film obtained by sputtering will have various compositions, depending on the conditions for sputtering, e.g. the atmospheric pressure and the discharging current. Thus, it is impossible to learn, from the composition of the target, the composition of the thin film formed by sputtering.

Furthermore, the thin film 14 may be an amorphous thin film of a gadolinium cobalt alloy whose cobalt atomic percentage is about 76 to 78%. Since a GdCo thin film of this composition is also amorphous, current noise generated by the boundary regions of polycrystals is negligible. Further, since the film has an axis of easy magnetization which is normal to the surface of the film, it may constitute a magnetic circuit having a high magnetic-electric conversion efficiency. If provided with the GdCo thin film of said composition, a magnetic head has a high S/N ratio and a high sensitivity. Still further, the GdCo thin film of this composition shows a rectangular hysteresis characteristic over a temperature range of $-20°$ C. to $+60°$ C. A rectangular hysteresis characteristic is indeed not desirable in reproducing analog signals such as audio signals. But such characteristic is suitable in reproducting FM signals or digital signals. This is because the output level of an element having rectangular hysteresis is hardly affected by interfering noise. Further, since the GdCo alloy is used in the form of a thin film Hall element (or a thin film magnetic-electric conversion element), the frequency characteristic curve of the magnetic head is flat over the frequency range from the DC region to a considerably high frequency region.

What is claimed is:

1. A multichannel magnetic head means comprising:

magnetic circuit means including a gap for detecting a magnetic flux and adapted to lead said magnetic flux;

an amorphous magnetic thin film held in said gap and consisting essentially of an alloy containing a rare earth element and a transition metal, said thin film having a single pair of current terminals and a plurality of Hall voltage terminals;

said amorphous thin film being arranged such that its surface is positioned substantially normal to the direction of the magnetic flux to be detected, and the composition ratio of said rare earth element is selected to be within a range of from about 10 to about 40 atomic percent so that said amorphous thin film has a magnetic anisotropy in a direction substantially normal to the surface thereof;

current leading means connected to said single pair of current terminals for leading a biasing current of said thin film along said gap;

the spacing between adjacent ones of said Hall voltage terminals for outputting said Hall voltage being more than about four times the width of said amorphous thin film so that crosstalk between channels due to domain wall motion is substantially eliminated;

said magnetic circuit means comprising a first ferromagnetic block and a second ferromagnetic block, each of said first and second ferromagnetic blocks having one or more ferromagnetic shielding portions which are sandwiched between non-magnetic portions arranged on said magnetic circuit means, said magnetic circuit means of said first ferromagnetic block being face to face with said magnetic circuit means of said second ferromagnetic block, and said first and second ferromagnetic blocks holding said amorphous magnetic thin film therebetween; and voltage outputting means connected to said Hall voltage terminals for outputting a Hall voltage for each channel corresponding to said magnetic flux, said voltage outputting means being provided in the corresponding number to the channels of said head and extending parallel to the direction in which said biasing current flows.

2. A multichannel magnetic head means according to claim 1, wherein said ferromagnetic blocks comprise a first insulator block and a second insulator block, said first and second insulator blocks sandwiching said amorphous magnetic thin film therebetween.

3. A multichannel magnetic head means according to claim 1, wherein said amorphous magnetic thin film is disposed in a front gap of the magnetic head.

4. A multichannel magnetic head means according to claim 1 or 2, further comprising a crosstalk cancelling circuit coupled to said Hall voltage terminals for generating voltages having an antiphase relation between output voltages derived from any two adjacent Hall voltage terminals for reducing crosstalk between channels.

5. A multichannel magnetic head means according to claim 1 or 2, comprising:

amplifiers coupled to said Hall voltage terminals, respectively, each of said amplifiers having a signal input terminal to which is input a Hall voltage signal corresponding to said magnetic flux, and an offset bias input terminal to which is supplied a DC potential which is substantially the same as that across said signal input terminal; and means for supplying an offset bias potential to said offset bias input terminals of said amplifiers such that said DC potential is a predetermined potential between a potential of one of said pair of current terminals and the other thereof.

6. A multichannel magnetic head means according to claim 1, wherein:

said magnetic circuit means comprises a number of magnetic circuit portions corresponding to the number of head channels; and at least portions of said Hall voltage terminals contacting said amorphous magnetic thin film are arranged on each of said magnetic circuit portions.

7. A multichannel magnetic head means according to claim 5, further comprising a crosstalk cancelling circuit coupled to outputs of said amplifiers for generating voltages having an antiphase relation between output voltages derived from any two adjacent Hall voltage terminals for reducing crosstalk between channels.

* * * * *